United States Patent
Shih et al.

(10) Patent No.: US 7,447,387 B2
(45) Date of Patent: Nov. 4, 2008

(54) ELECTRO-OPTICAL MODULATOR WITH CURVING RESONATOR

(75) Inventors: Chih-Tsung Shih, Hsinchu (TW); Huai-Yi Chen, Hsinchu County (TW); Shiuh Chao, Hsinchu (TW); Shin-Ge Lee, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/563,034

(22) Filed: Nov. 24, 2006

(65) Prior Publication Data

US 2008/0056636 A1 Mar. 6, 2008

(30) Foreign Application Priority Data

Sep. 4, 2006 (TW) .............................. 95132537 A

(51) Int. Cl.
*G02F 1/01* (2006.01)

(52) U.S. Cl. .............................. 385/2; 385/32; 385/39; 385/50

(58) Field of Classification Search ........................ None
See application file for complete search history.

(56) References Cited

U.S. PATENT DOCUMENTS 6,298,177 B1  10/2001  House
7,120,338 B2 *  10/2006  Gunn, III ..................... 385/50
2003/0068134 A1 *  4/2003  Gunn ........................... 385/50
2006/0215949 A1 *  9/2006  Lipson et al. .................. 385/2

OTHER PUBLICATIONS

C. Li. et al. Active silicon microring resonators using metal-oxide-semiconductor capacitors. 1st IEEE International Conference on Group IV Photonics (2004), pp. 19-21, Sep.-Oct. 2004.*
C. Li. et al. Active silicon octagonal micropillar resonator modulators using metal-oxide-semiconductor capacitors. Conference on Lasers and Electro-Optics (2005), pp. 113-115, vol. 1, May 2005.*
C.A. Barrios et al. Silicon photonic read-only memory. Journal of Lightwave Technology, vol. 24 No. 7, pp. 2898-2905, Jul. 2006.*

(Continued)

*Primary Examiner*—Rodney B. Bovernick
*Assistant Examiner*—Mike Stahl
(74) *Attorney, Agent, or Firm*—Jianq Chyun IP Office

(57) ABSTRACT

An electro-optical modulator includes a structural substrate having insulating layer. A waveguide layer is on the insulating layer. A resonant layer on the insulating layer has a curving rim adjacent to the waveguide layer to form an optical coupling region. A gate dielectric layer covers part of the resonant layer. A dielectric layer over the resonant layer covers the gate dielectric layer. The dielectric layer has a first opening exposing part of the resonant layer and a second opening exposing the gate dielectric layer. Part of the second opening is adjacent to the curving rim of the resonant layer. A first polysilicon layer on the exposed region of the resonant layer serves as an electrode. A second polysilicon layer over the dielectric layer fills the second opening and is in contact with the gate dielectric layer. Part of the second polysilicon layer covering the dielectric layer serves as an electrode.

16 Claims, 4 Drawing Sheets

OTHER PUBLICATIONS

Graham T. Reed, Andrew P. Knights, "Optical Phase Modulators and Variable Optical Attenuators" of A Selection of Photonic Devices, Published Online: Dec. 28, 2004, pp. 152-153, 2004 John Wiley & Sons, Ltd.

Ansheng Liu, Richard Jones, Ling Liao, Dean Samara-Rubio, Doron Rubin, Oded Cohen, Remus Nicolaescu and Mario Paniccia, "A high-speed silicon optical modulator based on a metal-oxide-semiconductor capacitor", Letters to Nature, nature, 427, 615-618, Feb. 12, 2004.

Özdal Boyraz, Prakash Koonath, Varun Raghunathan, and Bahram Jalali, "All optical switching and continuum generation in silicon waveguides", Optics Express, vol. 12, Issue 17, pp. 4094-4102, (Aug. 2004).

Qianfan Xu, Bradley Schmidt, Sameer Pradhan, and Michal Lipson, "Micrometre-scale silicon electro-optic modulator", Letters to Nature, May 19, 2005, vol. 435, pp. 325-327.

* cited by examiner

ELECTRO-OPTICAL MODULATOR WITH CURVING RESONATOR

CROSS-REFERENCE TO RELATED APPLICATION

This application claims the priority benefit of Taiwan application serial no. 95132537, filed on Sep. 4, 2006. All disclosure of the Taiwan application is incorporated herein by reference.

BACKGROUND OF THE INVENTION

1. Field of the Invention

The present invention relates to an electro-optical modulator. More particularly, the present invention relates to an electro-optical modulator with a curving metal-oxide semiconductor (MOS) device.

2. Description of Related Art

Signal transmission is expected to be changed from previous long-distance transmission, middle-distance transmission, and current module-to-module transmission to chip-to-chip transmission and intra-chip transmission in the future. Conventional cable transmission will be confronted with bottleneck along with the increases in both transmission speed and bandwidth. To meet such requirement, the characteristic of high transmission speed of optical signal has to be integrated with module-to-module, chip-to-chip, or even intra-chip transmission through optical waveguide.

In the future, if the processing speed of an intra-chip communication product in an integrated circuit (IC) is increased up to certain degree, for example, the operation speed of a central processing unit (CPU) reaches 5 GHz, then the internal transmission interface in the IC has to reach certain speed correspondingly. The previous low-cost copper cable design is confronted with bottleneck in the design of high frequency signal transmission. The design and fabrication of such high frequency circuit is very complex and has high cost, thus, copper cable loses its advantage in such circuit design.

Accordingly, electro-optical system chip is one of the major techniques to be developed, wherein an electro-optical modulator of high speed, small volume, and CMOS process compatibility is further required to meet the requirements of intra-chip communication. Usually a semiconductor electro-optical modulator changes the resonant property of a resonator corresponding to an operating wavelength by controlling free carriers of a semiconductor, so as to serve as an optical switch and accordingly to transmit digital signals quickly.

FIG. 1 is a cross-sectional view illustrating the semiconductor structure of a conventional electro-optical modulator. Referring to FIG. 1, a conventional electro-optical modulator is composed of a P-I-N diode. A silicon oxide insulating layer 102 is formed on a silicon substrate 100. A silicon layer 104 having a rib thereon is formed on the insulating layer 102 to serve as a resonator. An N-doped region 106 and a P-doped region 108 are respectively disposed at two sides of the rib, and an operation voltage is supplied to the two by a cathode 112 and an anode 114. Besides, a silicon oxide layer 110 covers the exposed silicon layer 104 between the cathode 112 and the anode 114. The structure illustrated in FIG. 1 adopts a diode as the base thereof, and dopants corresponding to the conductive types of the N-doped region 106 and the P-doped region 108 are respectively doped into the silicon layer 104 to form the diode. The optical resonator is provided by the silicon layer 104 having a rib. The mechanism of the electro-optical modulator described above is achieved by controlling free carriers of the semiconductor. However, the running speed of free carriers is very slow, so that the speed of the electro-optical modulator is lower than 1 GHz. An improved design has been provided in U.S. Pat. No. 6,298,177 to increase operation speed.

FIG. 2 is a cross-sectional view illustrating the semiconductor structure of a conventional annular electro-optical modulator. Referring to FIG. 2, another design of electro-optical modulator is described in pages 325-327 of NATURE Vol. 435 issued on 19, May 2005, wherein a micro-ring resonator is used as the base of the electro-optical modulator. A linear waveguide 120 has an input terminal and an output terminal. An optical signal is input from the input terminal. An annular resonator and the linear waveguide 120 have an optical coupling region which can lead the input optical signal having operating wavelength into the annular resonator. The transverse structure of the annular resonator is a resonant silicon layer having three regions. The resonant silicon layer has an annular rib 122 in the middle to achieve resonant effect along with the resonant mode. An N-doped annular region 126 is disposed at the external rim of the rib 122 to serve as a cathode. A P-doped region 124 is disposed at the internal rim of the rib 122 to serve as an anode.

The operation mechanism illustrated in FIG. 2 is to modulate an optical signal through the resonant effect to a particular wavelength. When a suitable voltage is supplied, the resonant wavelength function changes along with the voltage level, wherein the characteristic resonant wavelength also shifts. Thus, the transmittance of an input light having fixed wavelength in the linear waveguide 120 changes along with the resonant state so that the effect of an optical switch is achieved.

However, the electro-optical modulators described above are both based on the design of Mach-Zehnder interference, thus, the lengths thereof, which are usually in mm level, are very long. Accordingly, the device has very large volume and is very difficult to be applied to intra-chip communication. An electro-optical modulator has to be high-speed, small-volume, and CMOS process compatible to meet the requirements of intra-chip communication. Moreover, such performances as high speed, small volume, and CMOS process compatibility of an electro-optical modulator are the concerning of future development.

SUMMARY OF THE INVENTION

Accordingly, the present invention is directed to provide an electro-optical modulator, wherein high operation speed is achieved through the design of a curving MOS device, and the size of the curving MOS device can be reduced effectively, for example, to micro-ring extent, and which is advantageous to the design of intra-chip communication.

The present invention provides an electro-optical modulator which includes a structural substrate having an insulating layer on top. A waveguide layer is disposed on the insulating layer. A resonant layer is disposed on the insulating layer and has a curving rim adjacent to the waveguide layer for forming an optical coupling region. A gate dielectric layer covers part of the resonant layer. A dielectric layer is disposed over the resonant layer and covers the gate dielectric layer. The dielectric layer has a first opening exposing part of the resonant layer and a second opening exposing the gate dielectric layer, wherein part of the second opening is adjacent to the curving rim of the resonant layer. A first polysilicon layer is disposed on the exposed region of the resonant layer to serve as a first electrode. A second polysilicon layer is disposed over the dielectric layer. The second polysilicon layer fills the second opening and is in contact with the gate dielectric layer, and part of the second polysilicon layer covers the dielectric layer to serve as a second electrode.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

An embodiment of the present invention provides an electro-optical modulator, wherein high operation speed is achieved through the design of a curving MOS device. Preferably, the curving MOS device is an annular MOS device. Embodiments with annular MOS device will be described below as examples; however, the present invention is not limited thereto. The size of the annular MOS device can be reduced effectively, for example, to the extent of micro-ring (smaller than 1 μm), and which is advantageous to the design of intra-chip communication. Some embodiments of the present invention will be described below; however, these embodiments are not intended to limit the present invention.

Figure 1:
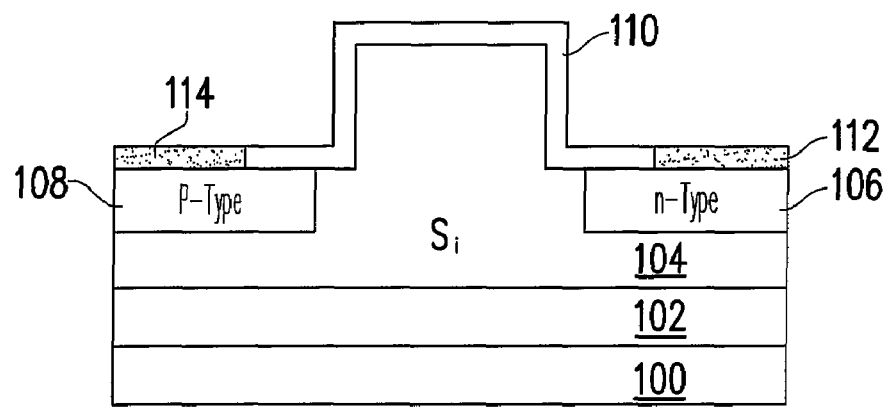
FIG. 1 is a cross-sectional view illustrating the semiconductor structure of a conventional electro-optical modulator.
Figure 2:
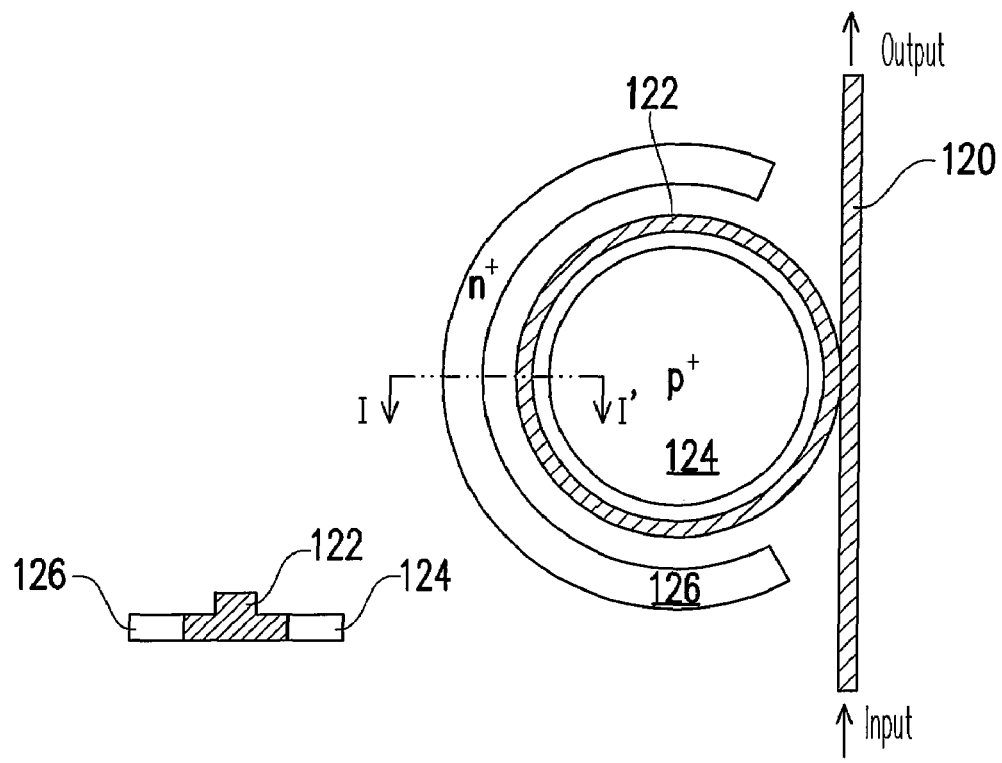
FIG. 2 is a cross-sectional view illustrating the semiconductor structure of a conventional annular electro-optical modulator.
Figure 3:
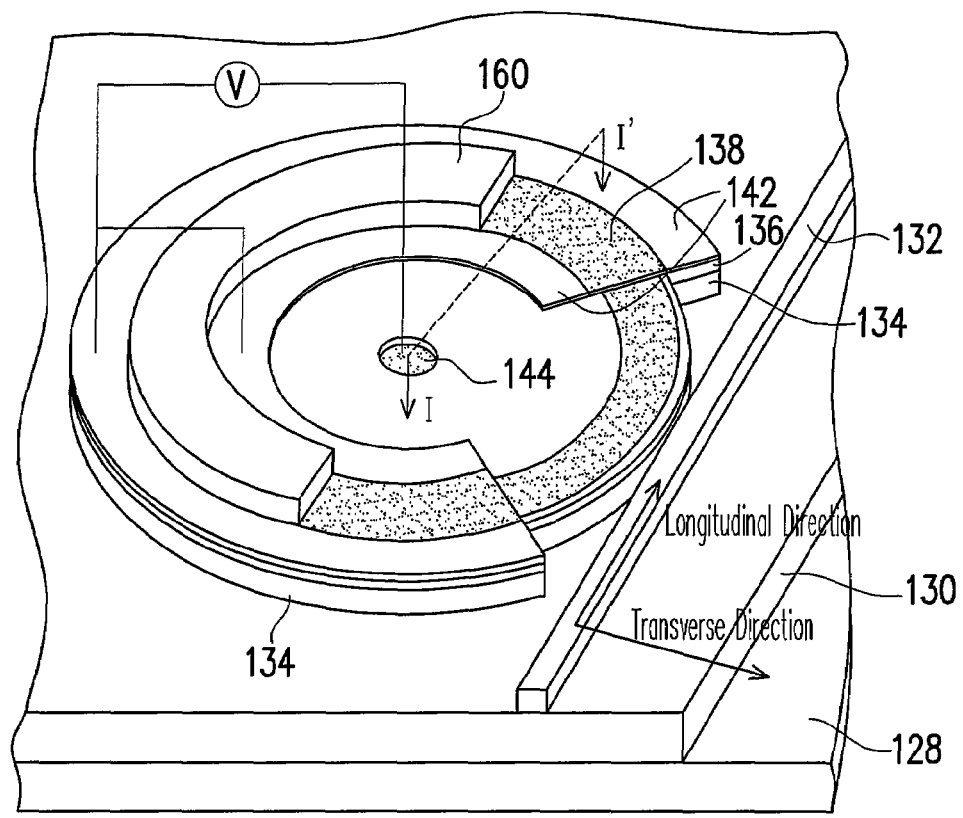
FIG. 3 is a perspective view, schematically illustrating the structure of an electro-optical modulator according to an embodiment of the present invention.
Figure 4:
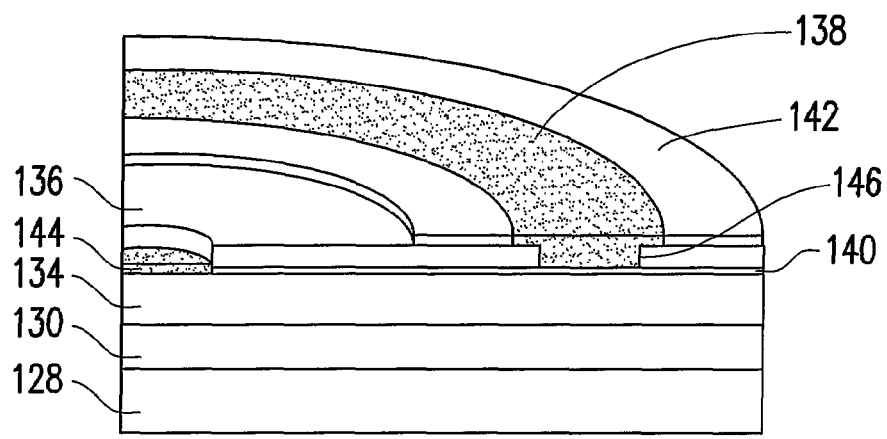
FIG. 4 is a cross-sectional view, schematically illustrating transverse structure of an annular resonator in an electro-optical modulator according to an embodiment of the present invention.

The electro-optical modulator in the present invention is of a semiconductor structure and the manufacturing method thereof is compatible to a semiconductor process, thus, the electro-optical modulator can be designed to have small volume and high operation speed. FIG. 3 is a perspective view illustrating the structure of an electro-optical modulator according to an embodiment of the present invention. FIG. 4 is a cross-sectional view, schematically illustrating transverse the structure of an annular resonator in an electro-optical modulator according to an embodiment of the present invention.

Referring to FIG. 3 and FIG. 4, the electro-optical modulator in the present embodiment may include a structural substrate having an insulating layer on top. The structural substrate may be an insulating layer 130 formed over a silicon wafer 128. Next, a silicon layer is formed over the insulating layer 130 and a desired structure is defined from the silicon layer. The insulating layer 130 may be a silicon oxide layer. Besides, a "silicon on insulation (SOI)" substrate in semiconductor process may be used as the structural base. In the SOI layer, a waveguide silicon layer 132 and a resonant silicon layer 134 are defined on the insulating layer 130. The waveguide silicon layer 132 may be a linear waveguide structure. The resonant silicon layer 134 is for providing the resonator to be formed later, for example, as a part of the annular resonator. Here the silicon material of the waveguide silicon layer 132 and the resonant silicon layer 134 is only an example, and other materials which can accomplish the characteristics of the waveguide layer and the resonant layer may also be used. The resonant silicon layer 134 has a curving rim, preferably an arc rim, adjacent to the waveguide silicon layer 132 to form an optical coupling region. However, the peripheral rim of the resonant silicon layer 134 is preferably circular to match the structure of the annular resonator, and the optical coupling region adjacent to the waveguide silicon layer 132 is a retracted curve, such as an arc.

A gate dielectric layer 140 is formed on the resonant silicon layer 134. The gate dielectric layer 140 may be directly formed on the resonant silicon layer 134 through a thermal oxidation process. The gate dielectric layer 140 mainly serves as an oxide of the MOS device between an annular polysilicon layer 138 to be formed subsequently and the resonant silicon layer 134. In other words, the gate dielectric layer 140 may also be defined as an annular structure corresponding to the annular polysilicon layer 138. Besides, the gate dielectric layer 140, such as the gate oxide, has an opening exposing a part of the resonant silicon layer 134. This exposed part corresponds to the position of an electrode, for example, a cathode (polysilicon 144), to be formed subsequently, for example, at the central region. After that, a dielectric layer 136 is formed over the resonant silicon layer 134 and which covers the gate dielectric layer 140. The dielectric layer 136 has an opening which also exposes the central region of the resonant silicon layer 134. The dielectric layer 136 further has an annular opening 146 exposing the gate dielectric layer 140. Part of the annular opening 146 is adjacent to the arc rim of the resonant silicon layer 134 and may be substantially parallel to the arc rim of the resonant silicon layer 134.

It should be noted that the gate dielectric layer 140 and the dielectric layer 136 may be formed separately or from a single layer. If the two are formed separately, the dielectric layer 136 may be a silicon nitride layer or a silicon oxide layer, and the gate dielectric layer 140 may be a silicon oxide layer. If the gate dielectric layer 140 and the dielectric layer 136 are formed from a single layer, a silicon oxide layer is formed through deposition first, and then a gate dielectric layer and a ring trench 146 are defined on the silicon oxide layer through photolithography and etching processes, and the bottom of the ring trench 146 selves as the gate dielectric layer. Accordingly, the gate dielectric layer 140 and the dielectric layer 136 in the present embodiment may be formed separately or formed as a single layer, and the formation method thereof is not limited in the present invention.

Next, a polysilicon layer 144 is disposed on the exposed region of the resonant silicon layer 134 and may serve as a cathode. An annular polysilicon layer 138 is disposed over the dielectric layer 136 and fills the annular opening 146. The annular polysilicon layer 138 is in contact with the gate dielectric layer 140. Part of the annular polysilicon layer 138 covers the dielectric layer 136 to serve as an electrode, for example, an anode (the polysilicon 142). The polysilicon at the anode and the cathode may usually be doped with suitable dopants. In FIG. 3 and FIG. 4, the polysilicon 142 at the anode may be disposed at two sides of the annular polysilicon layer 138. It should be noted that the structure of the anode may not be as illustrated in the embodiment. Next, a passivation layer 160 may further be formed on the annular polysilicon layer 138.

Moreover, the interconnection structures of the anode and the cathode may also be manufactured through semiconductor process and which will not be described herein. Since the manufacturing process of the electro-optical modulator in the present invention is compatible to semiconductor process, the manufacturing cost of the electro-optical modulator can be reduced.

The part of the annular polysilicon layer 138 that fills in the annular opening 146 forms an annular resonator with the resonant silicon layer 134, wherein the size of the annular resonator may be smaller than 1 μm, and the operation frequency thereof may be above 1 GHz. The length of the annular resonator is 2πR, and the annular resonator produces resonance to a light of a particular wavelength. However, the resonant wavelength is shifted because a voltage is supplied to the annular resonator by the electrode. The supplied voltage produces an electric field. Here the electric field may be an electric field of a fixed value or an electromagnetic field. Generally speaking, any method or mechanism which can shift the resonant wavelength is applicable. For example, the material characteristics of a typical nonlinear material corresponding to different refractive directions are described by a factor matrix, thus, the nonlinear material produces nonlinear resonant response to the electric field of the light wave. The material characteristics of the nonlinear material may also be used for changing optical resonance.

Figure 5A:
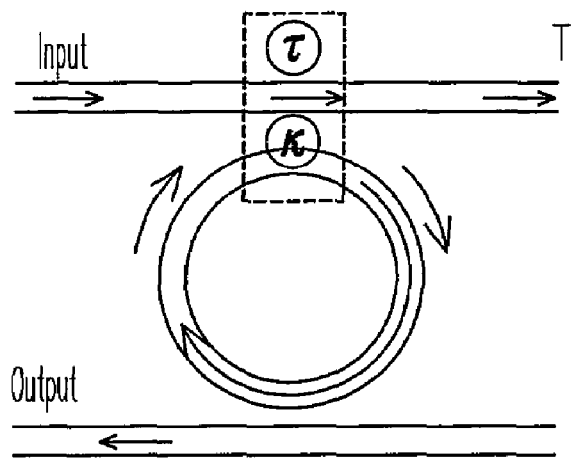
FIG. 5A is a diagram, schematically illustrating the resonance mechanism of an electro-optical modulator.
Figure 5B:
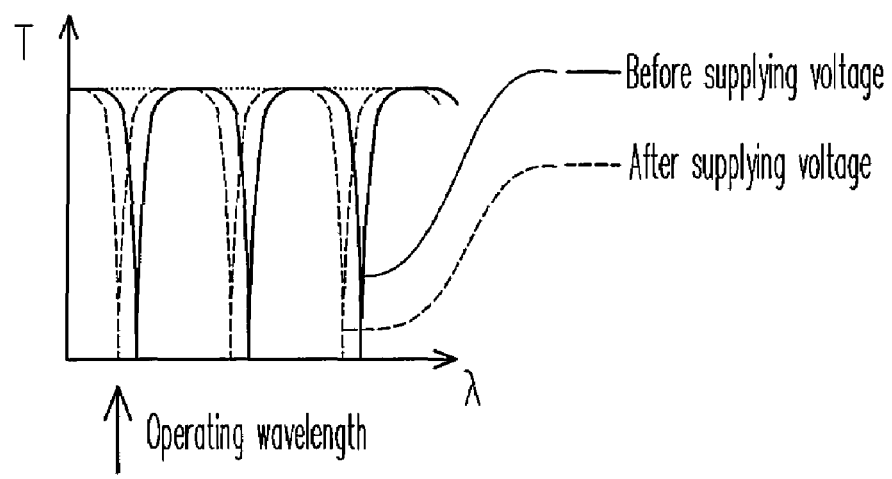
FIG. 5B is a diagram, schematically illustrating the transmittance distribution of an electro-optical modulator corresponding to optical wavelengths.

An annular resonator used as an optical switch will be described below. However, the electro-optical modulator is not limited to application of optical switch. FIG. 5A is a diagram illustrating the resonance mechanism of an electro-optical modulator. FIG. 5B is a diagram illustrating the transmittance distribution of an electro-optical modulator corresponding to optical wavelengths. Referring to FIG. 5A, there may be coupling constants τ and κ between a waveguide layer and an annular resonator. Also referring to FIG. 5B, when an input light is input from the left side as shown by the arrow, according to the characteristics of a coupling function, if the wavelength of the input light is not identical to the resonant wavelength of the annular resonator, almost all the input light passes through waveguide layer to be output from the right side and the transmittance thereof is almost 1. When the wavelength of the input light is identical to the resonant wavelength, part of the input light is coupled into the annular resonator and another part thereof continues to pass through the waveguide layer so that the transmittance thereof is reduced. The annular resonator has a characteristic resonant wavelength. When the wavelength of the input light is identical to the resonant wavelength, almost all the light enter the annular resonator, thus, the transmittance thereof is almost 0. Another waveguide layer may be further disposed and coupled to the annular resonator to couple out the light in the annular resonator.

It should be noted that the characteristic resonant wavelength of the annular resonator changes along with the voltage supplied, as the two curves shown in FIG. 5B, and the characteristic resonant wavelength is reduced when the voltage is supplied. Thus, as to a selected operating wavelength, such as a characteristic resonant wavelength when the voltage is supplied, if no voltage is supplied then the output light has higher transmittance, for example, at a high level. When the voltage is supplied, the output light has at lower transmittance, for example, at a low level. The embodiment described above is not the only application of the present invention; instead, the application varies along with the setting of the operating wavelength. Furthermore, the design illustrated in FIG. 5A may also be switching between two wavelengths and using another waveguide layer (below) to output. In other words, the electro-optical modulator in the present invention may be applied differently and may have many variations.

Figure 6:
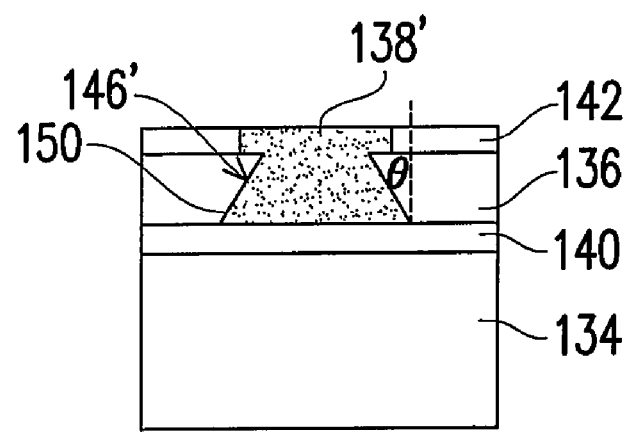
FIG. 6 is a diagram, schematically illustrating another design of the annular opening according to an embodiment of the present invention.

The sidewall of the annular opening 146 of the dielectric layer 136 being substantially perpendicular to the resonant silicon layer 134 is illustrated in FIG. 4 as an example. However, the sidewall of the annular opening 146 may also have an obliquity θ in relative to the resonant silicon layer 134. FIG. 6 is a diagram illustrating another design of the annular opening according to an embodiment of the present invention. Referring to FIG. 6, the sidewall 150 of the annular opening 146' of the dielectric layer 136 may have an obliquity θ in relative to the direction perpendicular to the resonant silicon layer 134. Accordingly the sidewall of the filling annular polysilicon layer 138' has an obliquity. The obliquity may increase the density of free carriers per unit volume, and which helps to form the resonant mode.

Figure 7:
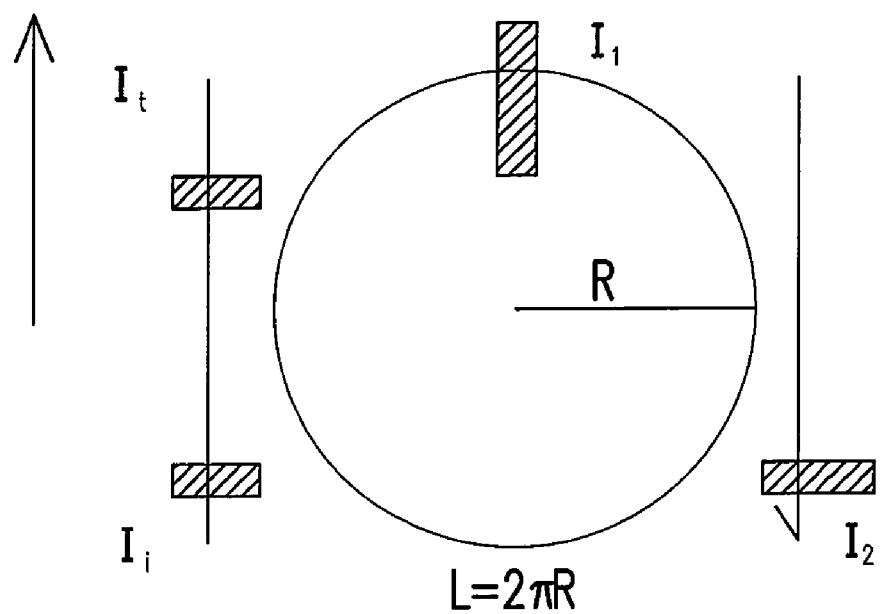
FIG. 7 is a schematic diagram of an electro-optical modulator according to an embodiment of the present invention.

Below, how to simulate the suitable values of other design parameters according to some required parameters when designing an electro-optical modulator will be described simply. FIG. 7 is a schematic diagram of an electro-optical modulator according to an embodiment of the present invention. Referring to FIG. 7, the radius of the annular resonator is R, so that the perimeter of the annular resonator is L=2πR, and the operating wavelength thereof is λ, β=2π/λ, so that the characteristics of the optical coupling coefficient κ, the optical mode absorption α, and the refractive coefficient variation ΔN due to the distribution of free carriers can be simulated. $I_i$ is the input light, and $I_1$, $I_2$, $I_t$ are the measured values or the expected values. The relational expressions thereof are as following:

$$\frac{I_2}{I_i} = \frac{\kappa}{\left(1 - \sqrt{1-\kappa}\, e^{-\frac{\alpha}{2}L}\right)^2 + \frac{4e^{-\frac{\alpha}{2}L}\sqrt{1-\kappa}}{\left(1 - e^{-\frac{\alpha}{2}L}\sqrt{1-\kappa}\right)^2}\sin^2\left(\frac{\beta L}{2}\right)} \times 0.97 e^{-\frac{\alpha}{2}L}; \quad (1)$$

$$\frac{I_t}{I_i} = \frac{\kappa(1 - e^{-\alpha L})}{\left(1 - \sqrt{1-\kappa}\, e^{-\frac{\alpha}{2}L}\right)^2 + \frac{4e^{-\frac{\alpha}{2}L}\sqrt{1-\kappa}}{\left(1 - e^{-\frac{\alpha}{2}L}\sqrt{1-\kappa}\right)^2}\sin^2\left(\frac{\beta L}{2}\right)} \times 0.97; \quad (2)$$

$$\kappa P_{i_n} e^{-\frac{\alpha}{2}L} = I_1 \quad (3)$$

The theoretical relations illustrated in expressions (1)-(3) can be induced by those skilled in the art from the structure illustrated in FIG. 7 and can further be used for simulative design, therefore won't be described herein.

According to the present invention, any material of the entire device in transverse direction is not limited to the material described above, and the modulation ability of the device can be greatly improved by the linear or nonlinear optical effect in the material produced by an electric field (including electromagnetic field) and the material refractivity variation produced accordingly.

According to the embodiments described above, various designs can be induced from the present invention. In the electro-optical modulator, the gate dielectric layer and the dielectric layer may form an oxide structure or may be dielectric layers formed separately.

In the electro-optical modulator, for example, a sidewall of the second opening of the dielectric layer is substantially perpendicular to the resonant layer or has an obliquity in relative to the resonant layer.

In the electro-optical modulator, for example, when the electro-optical modulator is operating, an input light having a particular wavelength is input from a first terminal of the waveguide layer and the input light enters the resonant layer through the optical coupling region. A voltage is supplied between the first electrode and the second electrode to change optical resonance and further to modulate the input light into an output light to be output from a second terminal of the waveguide layer.

In the electro-optical modulator, for example, the quantity of the output light is at a first level when the voltage is not supplied, while the quantity of the output light is at a second level when the voltage is supplied.

In the electro-optical modulator, for example, optical resonance is change by an electric field produced by the voltage supplied or through material nonlinearity.

In the electro-optical modulator, for example, the gate dielectric layer includes a silicon oxide layer, while the dielectric layer includes a silicon nitride layer.

In the electro-optical modulator, for example, a peripheral rim of the resonant layer is circular, but the peripheral rim has a retracted area, namely, the curving rim.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electro-optical modulator, comprising:
    a structural substrate, having an insulating layer on top;
    a waveguide layer, disposed on the insulating layer;
    a resonant layer, disposed on the insulating layer, wherein the resonant layer has a curving rim adjacent to the waveguide layer to form an optical coupling region;
    a gate dielectric layer, covering part of the resonant layer;
    a dielectric layer, disposed over the resonant layer and covering the gate dielectric layer, wherein the dielectric layer has a first opening exposing part of the resonant layer and a second opening exposing the gate dielectric layer, wherein part of the second opening is adjacent to the curving rim of the resonant layer;
    a first polysilicon layer, disposed on the exposed region of the resonant layer to serve as a first electrode; and
    a second polysilicon layer, disposed over the dielectric layer, filling the second opening, being in contact with the gate dielectric layer, part of the second polysilicon layer covering the dielectric layer to serve as a second electrode.

2. The electro-optical modulator as claimed in claim 1, wherein the gate dielectric layer and the dielectric layer form an oxide structure.

3. The electro-optical modulator as claimed in claim 1, wherein the polysilicon layers of the first electrode and the second electrode have dopants.

4. The electro-optical modulator as claimed in claim 1, wherein a sidewall of the second opening of the dielectric layer is substantially perpendicular to the resonant layer.

5. The electro-optical modulator as claimed in claim 1, wherein a sidewall of the second opening of the dielectric layer has an obliquity in relative to the resonant layer.

6. The electro-optical modulator as claimed in claim 1 further comprising a passivation layer disposed on the second polysilicon layer.

7. The electro-optical modulator as claimed in claim 1, wherein when the electro-optical modulator is in operation, an input light having a particular wavelength is input from a first terminal of the waveguide layer and enters the resonant layer through the optical coupling region, and a voltage is supplied between the first electrode and the second electrode to change an optical resonance and further to modulate the input light into an output light to be output from a second terminal of the waveguide layer.

8. The electro-optical modulator as claimed in claim 7, wherein the quantity of the output light is at a first level when the voltage is not supplied, while the quantity of the output light is at a second level when the voltage is supplied.

9. The electro-optical modulator as claimed in claim 7, wherein the voltage produces an electric field to change optical resonance.

10. The electro-optical modulator as claimed in claim 1, wherein optical resonance is changed through nonlinearity of material.

11. The electro-optical modulator as claimed in claim 1, wherein the structural substrate, the waveguide layer, and the resonant layer are of "silicon on insulation" (SOI) structure.

12. The electro-optical modulator as claimed in claim 1, wherein the gate dielectric layer comprises silicon oxide layer.

13. The electro-optical modulator as claimed in claim 1, wherein the dielectric layer comprises silicon nitride layer.

14. The electro-optical modulator as claimed in claim 1, wherein the insulating layer of the structural substrate comprises an oxide.

15. The electro-optical modulator as claimed in claim 1, wherein a peripheral rim of the resonant layer is circular, but the peripheral rim has a retracted area which is an arc rim serving as the curving rim.

16. The electro-optical modulator as claimed in claim 1, wherein a material of the waveguide layer and the resonant layer is silicon.

* * * * *